Figure 1:
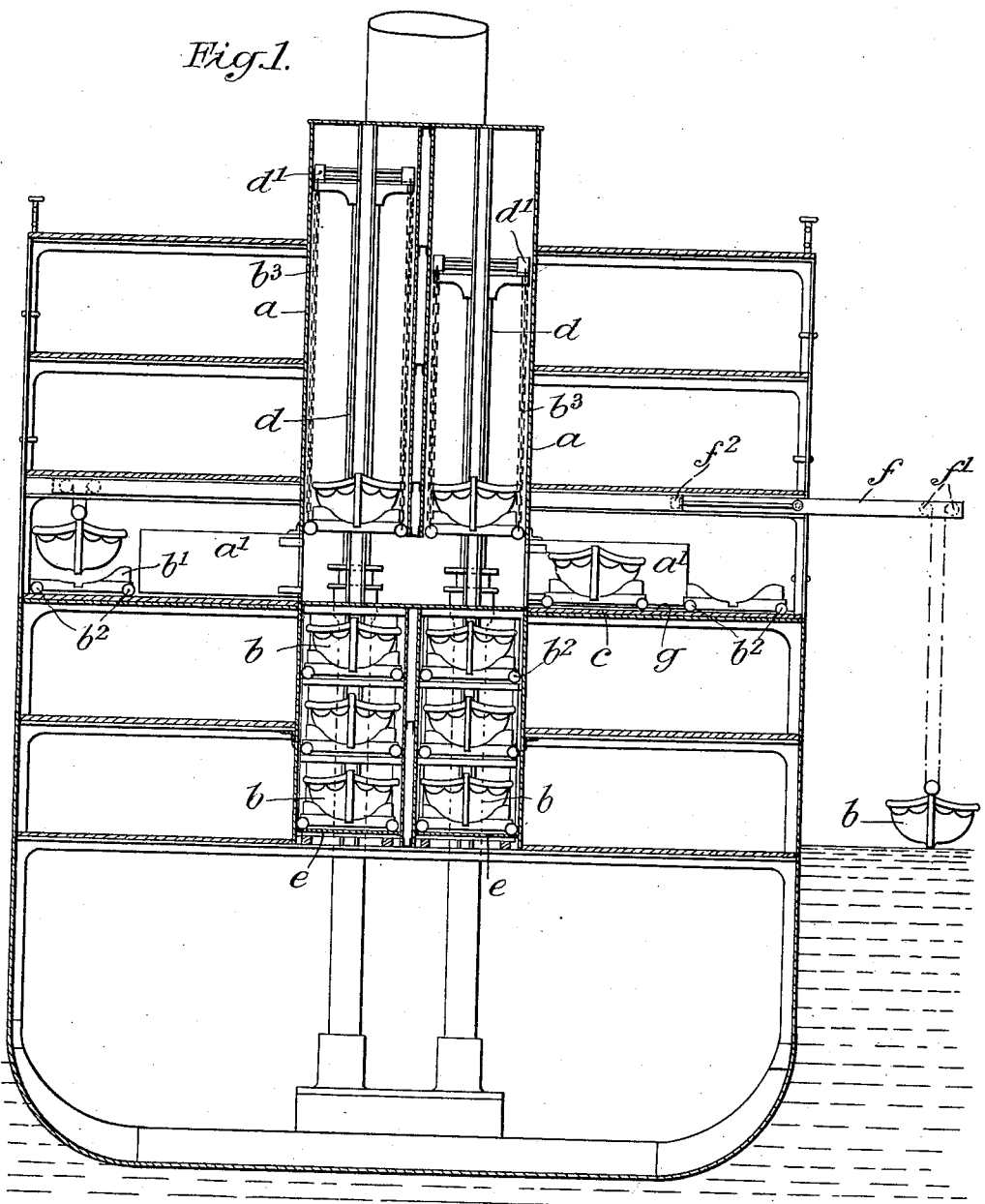

H. HAWTHORN.
SYSTEM AND APPARATUS FOR CARRYING LIFE AND OTHER BOATS ON SHIPS AND FOR LAUNCHING SAME THEREFROM.
APPLICATION FILED JUNE 30, 1913.

1,084,630.

Patented Jan. 20, 1914.
4 SHEETS—SHEET 3.

WITNESSES
Alfred R. Anderson
John H. Hoving

INVENTOR
HAROLD HAWTHORN
By H. van Dedemul
ATTORNEY

COLUMBIA PLANOGRAPH CO., WASHINGTON, D. C.

H. HAWTHORN.
SYSTEM AND APPARATUS FOR CARRYING LIFE AND OTHER BOATS ON SHIPS AND FOR LAUNCHING SAME THEREFROM.
APPLICATION FILED JUNE 30, 1913.

1,084,630.

Patented Jan. 20, 1914.

4 SHEETS—SHEET 4.

WITNESSES
Alfred R. Anderson
John H. Noving

INVENTOR
HAROLD HAWTHORN
By H. Van Dedemvel
ATTORNEY

UNITED STATES PATENT OFFICE.

HAROLD HAWTHORN, OF SHEENHURST, EAST SHEEN, ENGLAND.

SYSTEM AND APPARATUS FOR CARRYING LIFE AND OTHER BOATS ON SHIPS AND FOR LAUNCHING SAME THEREFROM.

1,084,630.   Specification of Letters Patent.   Patented Jan. 20, 1914.

Application filed June 30, 1913. Serial No. 776,621.

*To all whom it may concern:*

Be it known that I, HAROLD HAWTHORN, a subject of the King of Great Britain and Ireland, residing at Sheenhurst, East Sheen, Surrey, England, have invented certain new and useful Improvements in and Relating to Systems and Apparatus for Carrying Life and other Boats on Ships and for Launching Same Therefrom, of which the following is a specification.

This invention has for its object a system of carrying and stowing boats on ships so as to take up a minimum area of deck space and to effect the launching of same in such a manner that every boat may be launched from either side of the ship by means of suitable apparatus placed at the safest and most convenient height above the water line.

Hitherto the usual system of carrying and stowing life and other boats on ships has been by distributing them over a boat-deck, some under davits and others adjacent thereto, each boat occupying its own separate area of boat-deck, and consequently on this boat-deck being usually the uppermost one on the ship, it is, especially on very large vessels, situated at a great height above the water line and entails a considerable amount of risk and danger when launching the boats under any but the most favorable conditions.

Now according to this invention the life and other boats are assembled in one or more boat docks, in which they are carried on suitable cradles and arranged one above the other in such a manner that when required for launching each boat is easily and quickly delivered on the launching deck, preferably one of the lower decks, where it is readily hooked up by suitable launching apparatus for launching over either side of the ship or if weather and other conditions are favorable both sides of the ship can be used at the same time for launching purposes. In one way of carrying out this invention one or more of these boat docks are built into the ship extending vertically from the launching deck upward to the required height and downward to the ship's bottom according to the capacity required. Within the boat docks hoisting gear is provided from which the boats are suspended each boat arranged on a cradle, which cradles are connected together in the boat deck by readily detachable short lengths of chain.

At the level of the launching deck openings are provided on opposite sides of the boat docks through which the boats can be brought on to the launching deck preparatory to lowering. In launching, the boats in the boat deck are lowered until the lowest boat rests on the launching deck, its connection with the cradle above are then cast off and the boat is pulled out on rails on to the launching deck. The falls are now connected to the stem and stern of the boat and the gear holding the boat on its cradle cast off when the boat is ready for lowering.

The invention is illustrated in the accompanying sheets of illustrative drawings in which:—

Figure 2:
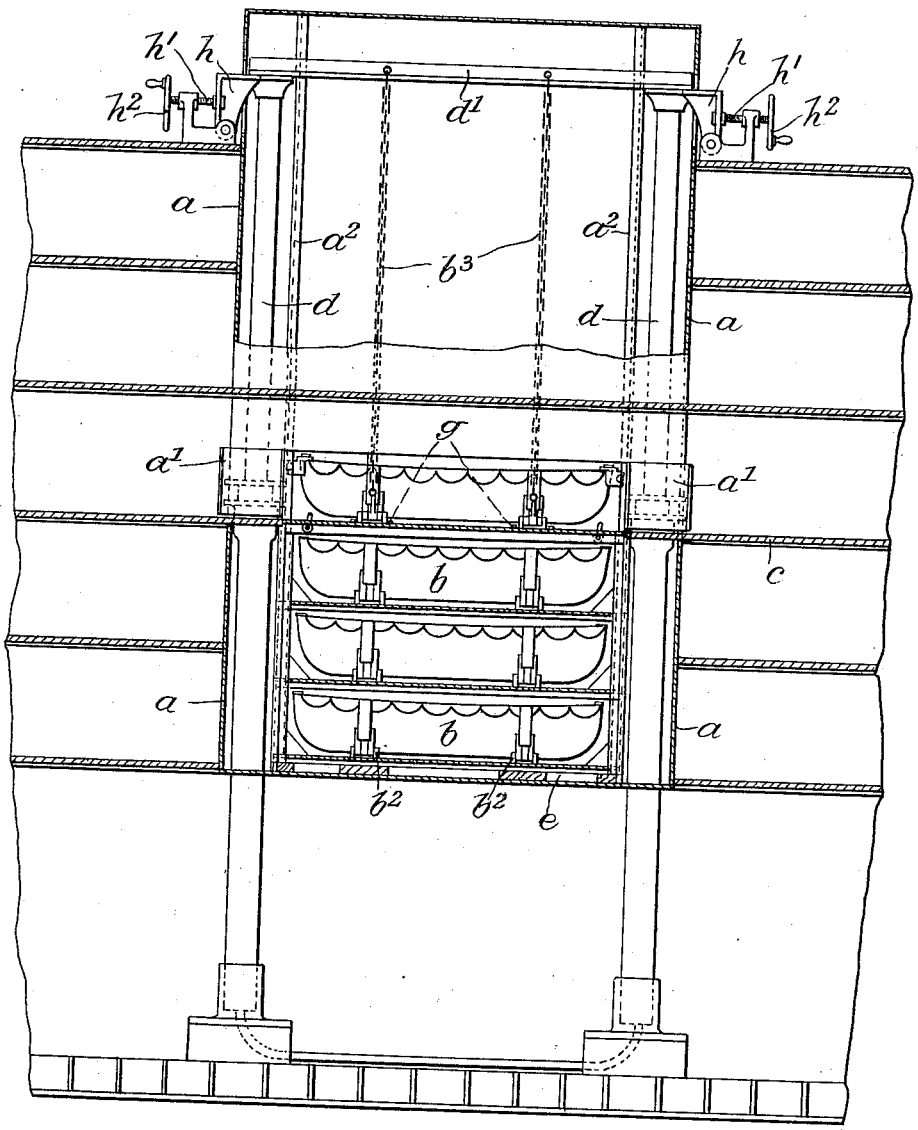
Figure 3:
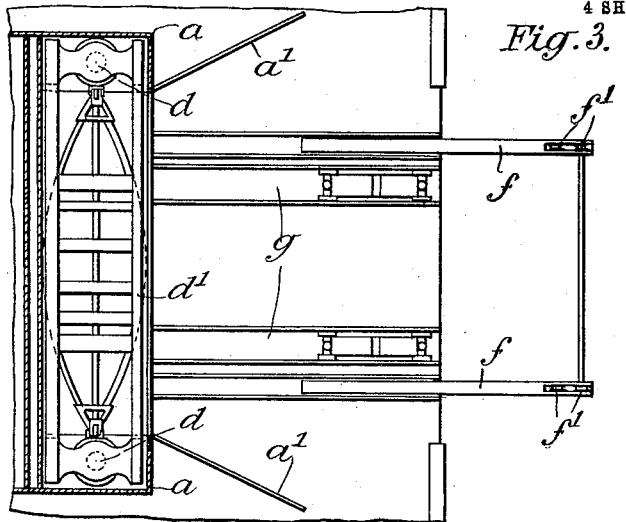
Figure 4:
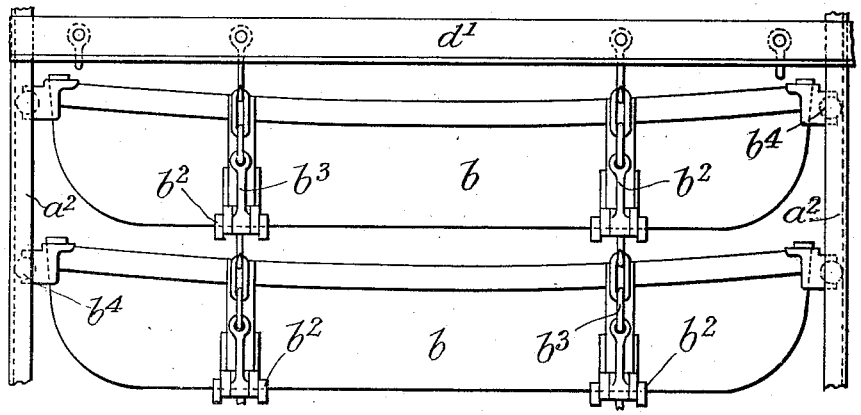
Figure 5:
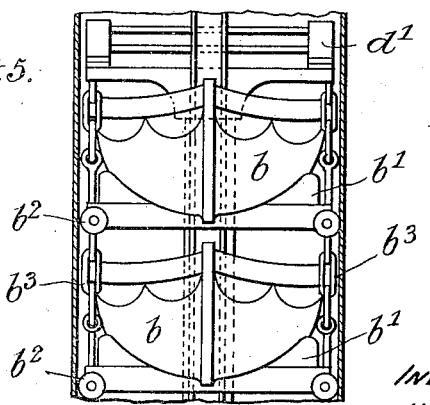
Figure 6:
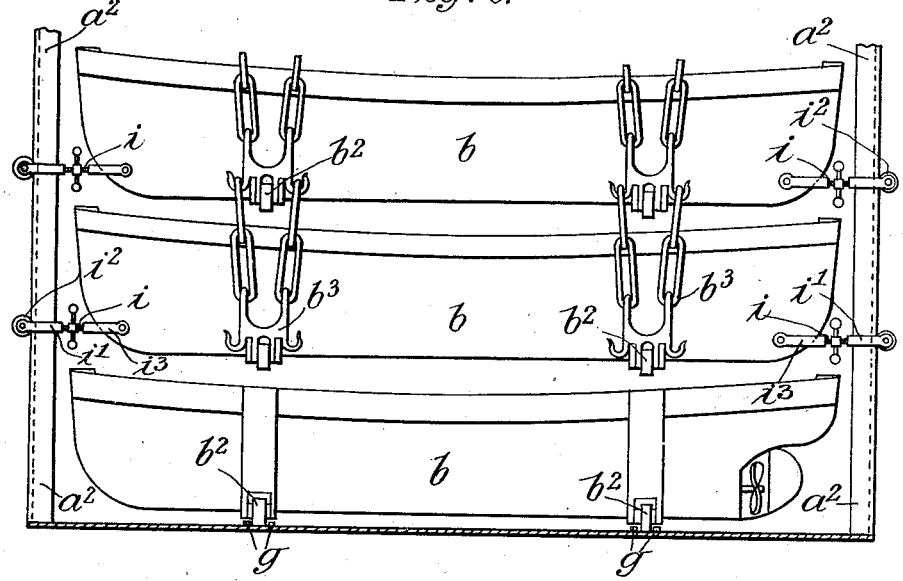
Figure 8:
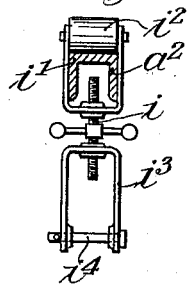
Figure 7:
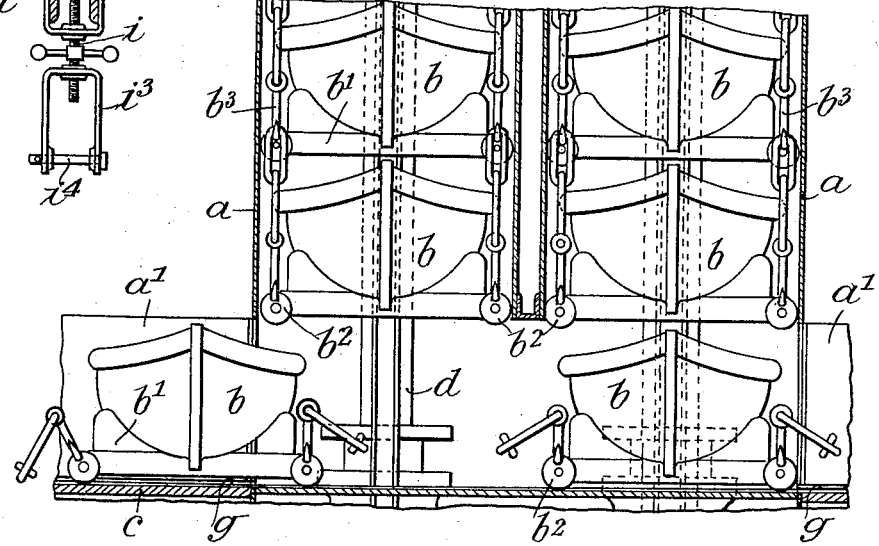

Figure 1 is a transverse section of a ship showing a double boat deck and launching gear for the same, Figs. 2 and 3 are longitudinal section and part plan respectively of the same. Figs. 4 and 5 are side and end detail views showing the boat suspension gear and Figs. 6 and 7 are similar views showing a modified construction of the same. Fig. 8 is a detail view of a screw coupling.

As seen in Figs. 1 to 5 I construct one or more caissons or boat-docks $a$ preferably built on the center line of the ship and of such area as to accommodate a life or other boat $b$, these docks being placed fore and aft of the ship and of such height as to contain as many boats arranged one above the other as may be safe and expedient. This boat dock is constructed to pass uninterrupted from the level of the launching deck $c$ through all other decks, and where means to hoist the boats up to the level of the launching deck are provided, the boat dock is continued uninterruptedly below the level of the launching deck as far down toward the bottom of the ship as may be required.

At the launching deck level suitable openings and doors $a'$ are provided on either side of the boat docks so as to give egress and access for the boats on to the launching decks on either side.

Each boat $b$ completely equipped and ready for launching rests on suitable blocks forming part of a cradle $b'$ on which it is carried and firmly secured by fastenings in such a manner as to be quickly and readily cast off when necessary. The cradle consists preferably of two or more blocks arranged at a convenient distance apart and serving as chocks in which the boat is placed and these blocks may be connected together by some suitable frame-work or tie-bars or other means so as to form a connected whole but capable of being readily disjointed and separated for removal if necessary after the boat is launched.

At or near the ends of the blocks forming the cradle small wheels $b^2$ are mounted and are so arranged as to press against the sides of the boat dock where they are free to rotate as the cradle and its boat is hoisted or lowered in the boat dock, they are also arranged to bear and carry the weight of the cradle and boat when lowered on to the launching deck $c$ and so form a carriage on which the boat is easily run out of the boat-dock on to the launching deck and under the hooks of the launching apparatus.

The cradles carrying their respective boats are suspended in the boat dock one above the other by short lengths of chain $b^3$ which can readily be connected to the cradle above, each cradle and its boat being quite clear of the one above it, and in such a manner that when a cradle and its boat reaches the launching deck its weight is transferred to the wheels $b^2$ on the cradle blocks. The chains $b^3$ can then be quickly and readily detached or removed so as to allow of the boat being run out to either side of the ship through the openings provided for that purpose in the sides of the boat-docks.

Within the boat dock a pair of hydraulic rams $d$ are arranged, their upper ends being connected by cross bars $d'$ from which the boats and their cradles are suspended by their chains $b^3$.

When boats are carried below the level of the launching deck a vertically slidable framework $e$ or other apparatus is provided for carrying the cradles, so that on reaching the launching deck they may be readily run out on to the deck $c$ and under the launching hooks. This framework $e$ is raised by connecting it to the cross bars $d'$ by suitable lengths of chain.

The sides and ends of the caissons or boat-docks are provided with suitable guides or channel irons $a^2$ up and down which the wheels $b^4$ on the ends of the boats and the wheels $b^2$ attached to the cradles can freely move but so arranged that no side or end play is possible in order that the cradles and their respective boats may be firmly held in position.

The launching deck $c$ is placed at the most convenient and safest height above the water line and all the boats in the caissons or boat-docks are lowered to it in the case of those suspended above its level and are hoisted to it in the case of those carried below its level.

The launching apparatus consists of two beams or girders $f$ arranged at a convenient height above the launching deck $c$ and mounted parallel to one another and horizontally across the ship, and are placed at each side of the boat dock running from it out to the sides of the ship. They are so designed that as the boats come out of the boat dock the beams are situated right over the lifting links attached to the stems and sterns of the boats and are mounted in such a manner that they are free to slide to and fro so that their outer ends may protrude over the sides of the ship when required to do so in order to safely launch the boats clear of the sides of the ship.

Each beam $f$ has mounted on it pulleys $f'$ and ropes for the purposes of hoisting out of and lowering the boats into the sea and also off and on to the launching deck. This tackle may either be fixed in a suitable position on the sliding beam or carried by a trolley arranged to travel to and fro along its length.

The beams $f$ are provided with the hydraulic rams $f^2$ which move them in and out over the side of the ship and operate the hoisting and lowering apparatus and trolley carrying it, if such is used.

Rails $g$ or other means are provided on the launching deck in order to facilitate running the boats and their cradles out of the boat-docks under the launching beams $f$ and mechanical means may be employed to assist in hauling the boats and their cradles across the decks out of the boat-dock.

The levers controlling the system are preferably concentrated at control stations conveniently placed near each boat-dock in such a manner that only one man is required to control all operations required for delivering the boats on the launching deck and lowering them into the sea.

Two movable arms or lugs $h$ are provided at the top of the boat docks for the purpose of easing or relieving the rams of the weight of the cradles and their boats when at rest in the docks, such arms, being so arranged as to be readily and quickly brought out of the way by mechanical means such as a screw $h'$ and hand wheel $h^2$ when the boats are to be lowered to the launching deck.

In the modified arrangement of boat suspension gear shown in Figs. 6 and 7 the cradles carry short lengths of chain $b^3$ with double links at their ends which engage double hooks on the cradles above. Furthermore for firmly securing the boats within the boat docks right and left hand coupling screws $i$ are provided at the stem and stern of the boats. The coupling screws $i$ carry at one end, shackles $i'$ with rollers $i^2$ which embrace the guide rails $a^2$ while at the other end the coupling screws are detachably connected to the boats by shackles $i^3$ and bolts $i^4$ adapted to pass through the stem and stern thereof.

When it is required to launch the boats the doors $a'$ in the sides of the boat docks $a$ are opened and the boat on its cradle which is already on the level of the launching deck is run out to which ever side of the ship it is wanted. Here the cradle may be temporarily secured to the deck and the boat loaded with passengers, and the hoisting hooks suspended from the beams or girders $f$ slipped into the hoisting links at the stem and stern. All being ready the fastenings holding the boat on its cradle are cast off and the boat is hoisted off its cradle and run-out board by means of the rams $f^2$ connected with the beams or girders $f$ or by means of the trolleys arranged to travel along the beams after the latter have been moved out overboard and the boat lowered into the sea. As soon as the cradle is clear of its boat it is run out of the way forward or aft or it may be separated into two or more portions and part passed forward and part aft so as to clear the road for the next boat. The first boat being clear of the boat dock, the next one above it is at once lowered on to the launching deck, its means of suspension removed, and it is run over toward the side of the ship ready to be hoisted in its turn and lowered into the sea and so on until all the boats suspended above the level of the launching deck have been dealt with, when any boats carried below its level may be hoisted and disposed of in the same way.

It will be seen that electric hoisting and lowering gear may be used in place of the hydraulic rams described in which case the cross-bars $d'$ would be merged into a substantial framework having wire ropes as a means of suspension, the said ropes being connected to electric hoisting motors. The said framework is steadied by guides or wheels suitably mounted on it and made to slide and bear against suitable guides arranged up and down the sides and ends of the caisson or boat-docks. The launching gear and beams and girders arranged to be projected over the sides of the ship may also be manipulated by electric motors through wire ropes or suitable mechanical apparatus in place of hydraulic rams.

Mechanism is provided so that in the event of necessity, hand-power may be brought into use in place of electrical power or hydraulic power usually employed as a stand-by for each separate operation.

I have described only one particular manner in which this system of carrying and launching boats may be carried out but I may vary or alter the details thereof or add to or otherwise deal with the various apparatus in order to more efficiently attain the objects of this invention.

What I claim and desire to secure by Letters Patent is:—

1. In means for storing and lowering life and other boats, the combination with a ship having a launching deck of a compartment adapted to hold boats and having an opening in the side thereof; a launching deck flush with the lower part of said opening; a plurality of cradles in said compartment and adapted to hold life boats thereon; a lifting means in said compartment; and short easily detachable links suspending said cradles one from the other and from the lifting means.

2. In means for storing and lowering life and other boats, the combination with a ship having a launching deck of a compartment adapted to hold boats and having an opening in the side thereof; a launching deck flush with the lower part of said opening; a plurality of cradles in said compartment and adapted to hold life boats thereon; a lifting means in said compartment; means suspending said cradles one from the other and from the lifting means and wheels on said cradles extending transversely of the deck.

3. In means for storing and lowering life and other boats on ships, the combination, with a ship having a launching deck, of a caisson extending above and below the launching deck and having openings at both sides at said deck; a lifting means at each end of the caisson; a cross-bar held longitudinally of the caisson by the lifting means; a plurality of cradles one above the other at the ends of the caisson; short detachable links suspending said cradles one from the other and from the cross-bar; life boats on said cradles; wheels on said cradles, disposed transversely of the ship for rolling the boat to near either side thereof; slidable transverse beams carried above and parallel to the launching deck and disposed laterally from the ends of the caisson on opposite sides; means for projecting said beams over the side of the ship; and a pulley on the outer end of each beam.

4. In means for storing and lowering life and other boats on ships, the combination, with a ship having a launching deck, of a caisson extending above and below the launching deck and having openings at both sides at said deck; a lifting means at each end of the caisson; a cross-bar held longitudinally of the caisson by the lifting means; a plurality of cradles one above the other at the ends of the caisson; short detachable links suspending said cradles one from the other and from the cross-bar; life boats on said cradles; wheels on said cradles, disposed transversely of the ship for rolling the boat to near either side thereof; slidable transverse beams carried above and parallel to the launching deck and disposed laterally from the ends of the caisson on opposite sides; means for projecting said beams over the side of the ship; a pulley on the outer end of each beam; vertical guide-rails at opposite ends of the caisson; and rollers mounted on the ends of the life boats and engaging the guide-rails.

5. In means for storing life and other boats on ships, the combination with a ship having a launching deck a suitable height above the water line and a plurality of decks above and below the launching deck; of a caisson substantially at the center line of the ship, extending above and below the launching deck through a plurality of decks and provided with openings toward the sides of the ship, at the launching deck; a hydraulic ram at each end of the caisson; cross-bars extending from one ram to the other and adapted to be lifted thereby; a plurality of cradles one above the other at each end of the caisson; short, easily detachable links suspending one cradle from the cradle just above and from the cross-bars; boats carried on the cradles; wheels on said cradles and disposed transversely of the boat, whereby the cradles and boats thereon may be rolled from the caisson toward either side of the ship; vertical guide-rails at opposite ends of the caissons; rollers mounted on the boats and engaging the guide rails; transverse slidable beams carried at the ceiling of the launching deck and extending laterally from the ends of the caissons; means for projecting said beams over the side of the ship; and a pulley on the outer ends of said beams for lowering the boats.

In testimony whereof I have affixed my signature, in presence of two witnesses.

HAROLD HAWTHORN.

Witnesses:
WALTER CHOVLES,
O. J. WORTH.

---

Copies of this patent may be obtained for five cents each, by addressing the "Commissioner of Patents, Washington, D. C."